(12) United States Patent
Hwang

(10) Patent No.: US 7,876,727 B2
(45) Date of Patent: Jan. 25, 2011

(54) HSDPA CQI, ACK, NACK POWER OFFSET KNOWN IN NODE B AND SRNC

(75) Inventor: Woonhee Hwang, Espoo (FI)

(73) Assignee: Nokia Corporation, Espoo (FI)

( * ) Notice: Subject to any disclaimer, the term of this patent is extended or adjusted under 35 U.S.C. 154(b) by 799 days.

(21) Appl. No.: 11/784,572

(22) Filed: Apr. 5, 2007

(65) Prior Publication Data

US 2007/0189223 A1     Aug. 16, 2007

Related U.S. Application Data

(62) Division of application No. 10/434,413, filed on May 8, 2003, now Pat. No. 7,343,172.

(60) Provisional application No. 60/379,917, filed on May 9, 2002.

(51) Int. Cl.
*H04W 4/00* (2009.01)

(52) U.S. Cl. .................. 370/331; 370/329; 370/332; 455/522; 455/436; 455/442; 455/69

(58) Field of Classification Search ............. 455/522, 455/442, 69; 370/318, 342
See application file for complete search history.

(56) References Cited

U.S. PATENT DOCUMENTS

| | | | |
|---|---|---|---|
| 5,258,983 A | 11/1993 | Lane et al. | |
| 6,085,108 A | 7/2000 | Knutsson et al. | |
| 6,389,265 B1 | 5/2002 | Jeschke et al. | |
| 6,590,905 B1 | 7/2003 | Suumaki et al. | |
| 6,618,589 B1 | 9/2003 | Rune et al. | |
| 6,708,041 B1 * | 3/2004 | Butovitsch et al. | 455/522 |
| 6,823,193 B1 * | 11/2004 | Persson et al. | 455/522 |
| 7,016,320 B1 | 3/2006 | Petersson et al. | |
| 7,035,662 B2 * | 4/2006 | Lee | 455/522 |
| 2002/0061764 A1 | 5/2002 | Kim et al. | 455/522 |
| 2003/0036403 A1 | 2/2003 | Shiu et al. | 455/533 |
| 2003/0232622 A1 | 12/2003 | Seo et al. | |
| 2004/0131026 A1 * | 7/2004 | Kim et al. | 370/328 |

FOREIGN PATENT DOCUMENTS

| | | |
|---|---|---|
| EP | 0493286 | 7/1992 |
| EP | 1081979 | 8/1999 |
| EP | 1058407 | 12/2000 |
| EP | 1089458 | 4/2001 |
| JP | 2003-298509 | 10/2003 |

OTHER PUBLICATIONS

International Search Report dated Dec. 1, 2003 issued in PCT Application No. PCT/IB03/01755.
Supplemental European Search Report dated Jun. 13, 2007 issued in EP Application No. 03719004.8.
Patent Abstracts of Japan, Publication No. 2003-298509, "Apparatus and method for transmitting and receiving downlink transmission power offset information in mobile communication system using uplink high speed packet access system," published Oct. 17, 2003.

* cited by examiner

*Primary Examiner*—David Q Nguyen (57) ABSTRACT

High speed data packet access (HSDPA) is facilitated by ensuring that power offsets are delivered to the base station (Node B) so that the new functions envisioned therefor having to do with scheduling and retransmission handling can be carried out effectively. A signal primitive having one or more information elements indicative of corresponding power offsets are received by the Node B, saved for future use and then signalled back to the serving radio network controller so that the user equipment can be informed with a proper RRC message containing the appropriate power offsets.

12 Claims, 9 Drawing Sheets

In case SRNC decides to change the values of CQI PO, ACK PO and NACK PO. - Using User Plane protocol - Frame structure

FIG. 1(c)
UTRAN side overall MAC architecture

FIG. 2
Radio Interface Protocol Architecture of HSDPA

FIG. 4
UTRAN side MAC architecture / MAC-hs details

FIG. 3

UTRAN side MAC architecture / MAC-c/sh details

FIG. 5

In case SRNC decides CQI PO, ACK PO and NACK PO. - RL Setup phase

FIG. 6
In case Node B decides CQI PO, ACK PO and NACK PO. - RL Setup phase

FIG. 7a

In case SRNC decides to change the values of CQI PO, ACK PO and NACK PO - Using Control Plane protocol FIG. 7b
In case SRNC decides to change the values of CQI PO, ACK PO and NACK PO - Using User Plane protocol

FIG. 9

In case Node B decides CQI PO, ACK PO and NACK PO.

HSDPA CQI, ACK, NACK POWER OFFSET KNOWN IN NODE B AND SRNC

CROSS REFERENCE TO RELATED APPLICATION

This application is a divisional of application Ser. No. 10/434,413 filed on May 8, 2003 now U.S. Pat. No. 7,343,172 which claims priority to provisional application 60/379,917 filed on May 9, 2002 and claims domestic priority under both 35 U.S.C. §119(e) and §120.

BACKGROUND OF THE INVENTION

Figures 1A, 1B:
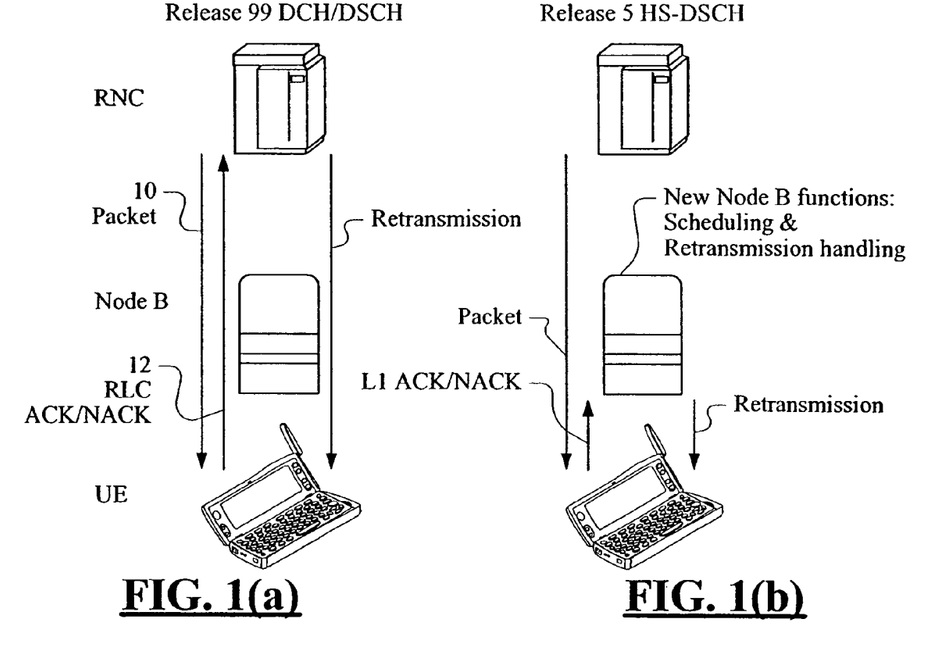
FIG. 1: UTRAN side overall MAC architecture showing the defined HSDPA network architecture in 3GPP. The figure shows a new MAC-hs entity, which is connected, to the MAC-c/sh through Iub-interface. The used transport channel under MAC-hs are HS-DSCH, which corresponds in rel99 shared channel concept DSCH transport channel.

As an enhancement to the release99/release4 (rel99/rel4) downlink shared channel (DSCH) concept in the third generation partnership project (3GPP) shown in FIG. 1(a) it has been agreed to add a so-called High Speed Downlink Packet Access (HSDPA) concept as a part of the 3GPP rel5 universal terrestrial radio access network (UTRAN) architecture as shown in FIG. 1(b). In FIG. 1(a) the DSCH is transmitted on a downlink Physical Downlink Shared CHannel (PDSCH) 10. In principle, the new HSDPA concept of FIG. 1(b) is an enhancement, because the leading idea in 3GPP has been to make HSDPA as an evolution from the shared channel concept not as a revolution. Therefore the defined solutions should resemble as much as possible the solutions which have already been defined for the shared channels. The basic idea behind the HSDPA is to offer a shared high speed channel with a higher data rate and a quick retransmission mechanism (i.e. with HARQ (=Hybrid Automatic Repeat Request)) from Node B. As can be seen by comparing FIG. 1(b) to FIG. 1(a), the Node B is given more intelligence for the purpose of handling retransmissions and scheduling functions, thus reducing the round trip delay between the mobile device and the RNC formerly handling retransmissions in FIG. 1(a). This makes retransmission combining feasible in the mobile device. In place of the variable spreading factor and fast power control used for the DSCH of FIG. 1(a), the HS-DSCH of FIG. 1(b) uses adaptive modulation and coding (AMC) in addition to the HARQ. A much smaller transmission time interval (TTI) of two milliseconds is also used instead of the 10 or 20 milliseconds of the DSCH. Also, the media access control (MAC) is located in the node B instead of the RNC. The AMC part of HSDPA utilizes adaptation of code rate, the modulation scheme, the number of multi-codes employed, as well as the transmit power per code. Even though many parameters are defined in the Radio Network Subsystem Application Part (RNSAP; see 3GPP TS25.423 v5.0.0) and Node B Application Part (NBAP; see 3GPP TS25.433 v5.0.0) to support HSDPA, the HSDPA discussion is on-going in 3GPP and many useful parameters are being added.

The user equipment is able to send a channel quality indicator (CQI) on the uplink HS-DPCCH (high speed dedicated physical control channel). It indicates the selected transport format resource combination (TFRC) and multi-code number currently supported by the UE.

Figure 1C:
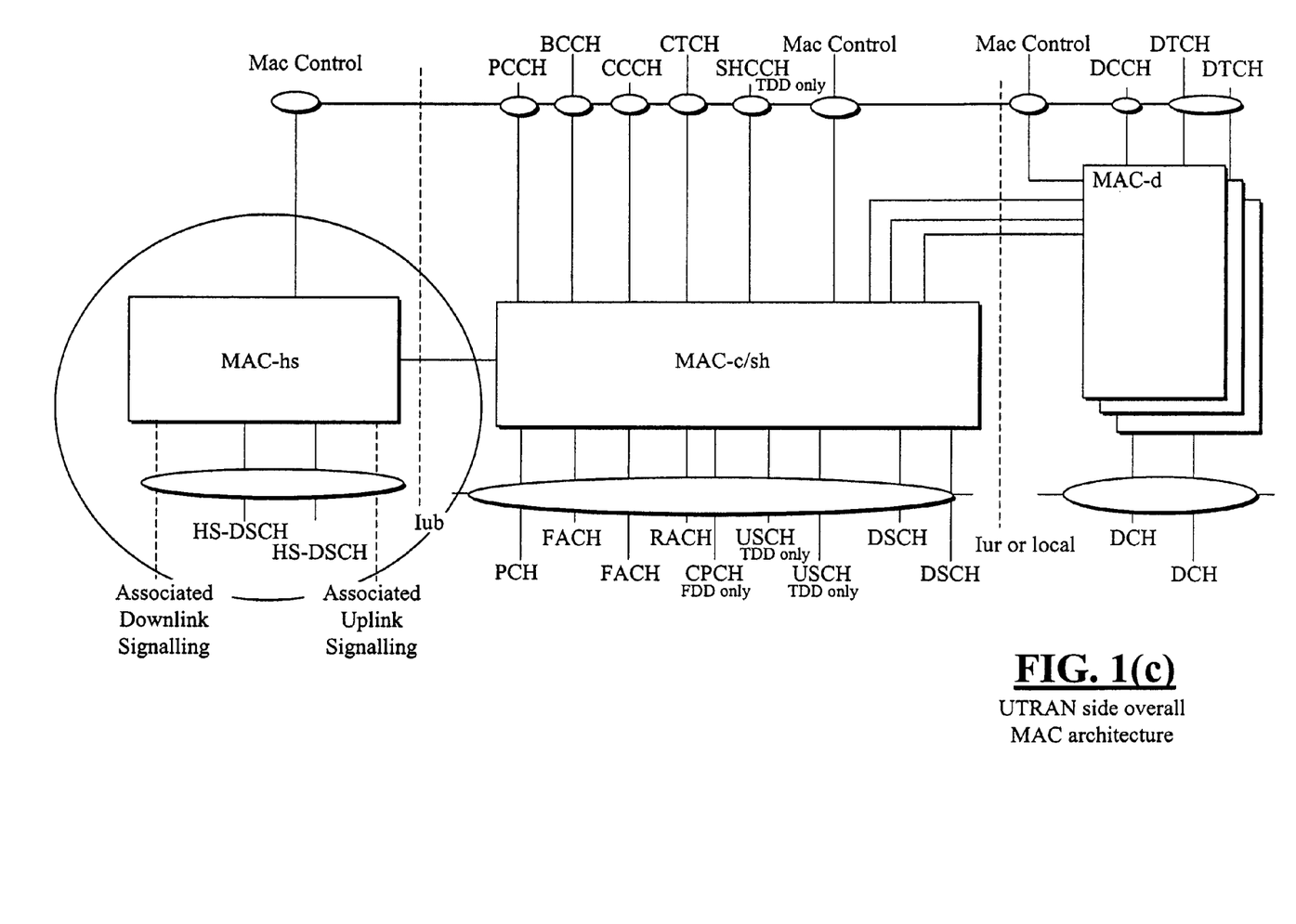

FIG. 1(c) shows further details of the proposed UTRAN side overall MAC architecture including the new MAC-hs. MAC-hs provides the essential functionalities to support HSDPA. MAC-hs has the scheduling function as well as HARQ.

Figure 2:
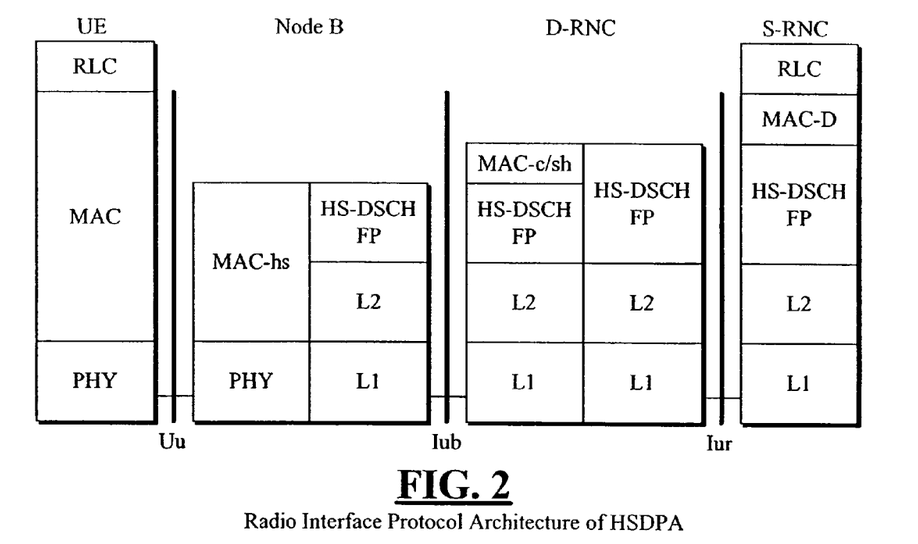
FIG. 2: Radio Interface Protocol Architecture of HSDPA. The defined protocol stack defines the HS-DSCH FP protocol to provide the HSDPA FP data frames through Iub-interface.
Figure 3:
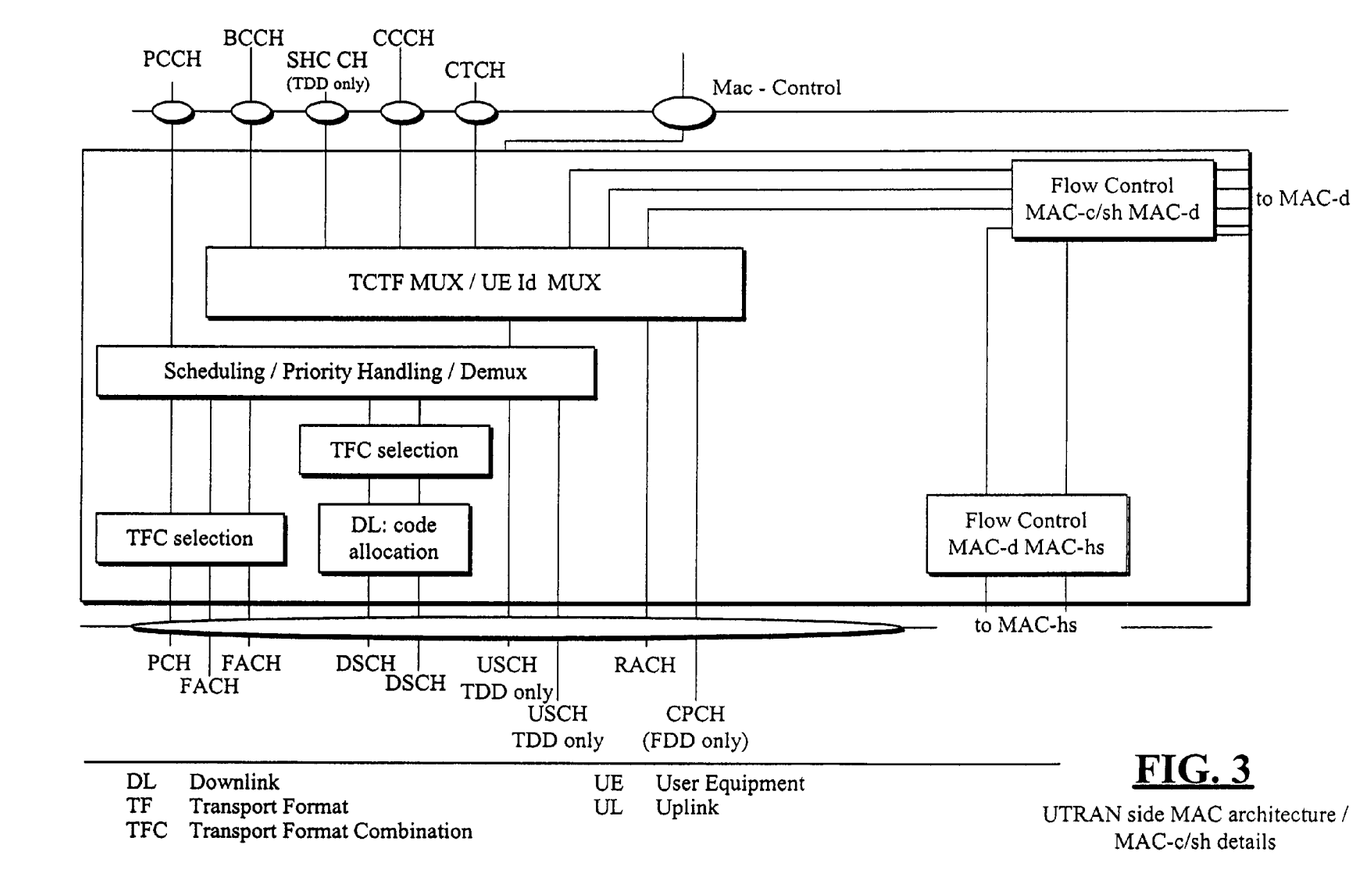
FIG. 3: UTRAN side MAC architecture/MAC-c/sh details.
Figure 4:
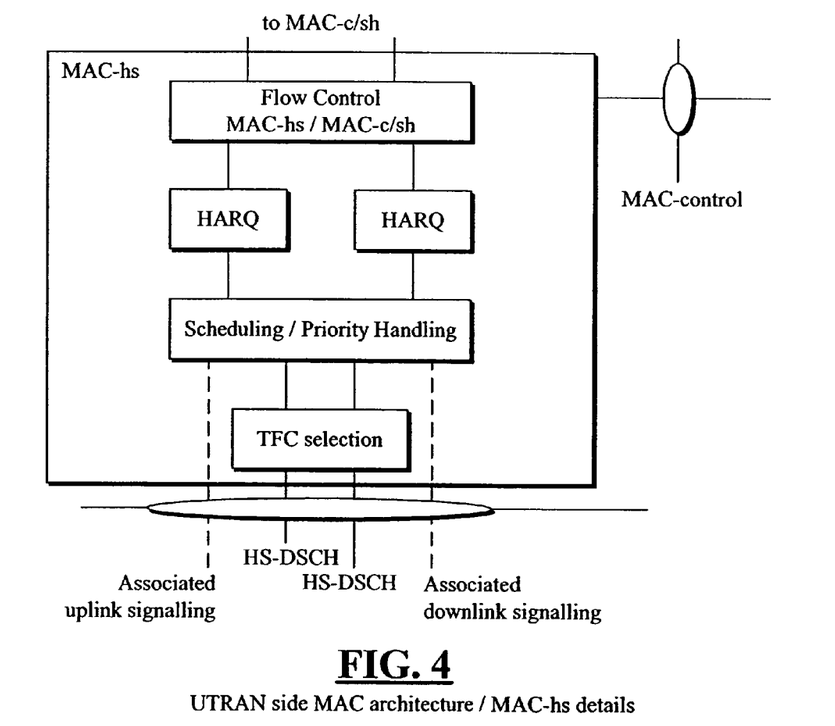
FIG. 4: UTRAN side MAC architecture/MAC-hs details.

Currently in 3GPP, the SRNC is supposed to send the CQI Power Offset, ACK Power Offset and NACK Power Offset to the UE via RRC layer messages. FIG. 2 shows a radio interface protocol architecture for HSDPA. The Power Offsets will be defined as relative to the DPCCH pilot bit. Then the UE will use these Power Offsets as follows:

When an uplink HS-DPCCH is active, the relative power offset $\Delta_{HS\text{-}DPCCH}$ between the DPCCH and the HS-DPCCH for each HS-DPCCH slot shall be set as follows:

For HS-DPCCH slots carrying HARQ Acknowledgement:

$\Delta_{HS\text{-}DPCCH}=\Delta_{ACK}$ if the corresponding HARQ Acknowledgement is equal to 1

$\Delta_{HS\text{-}DPCCH}=\Delta_{NACK}$ if the corresponding HARQ Acknowledgement is equal to 0

For HS-DPCCH slots carrying CQI:

$\Delta_{HS\text{-}DPCCH}=\Delta_{CQI}$

The values for $\Delta_{ACK}$, $\Delta_{NACK}$ and $\Delta_{CQI}$ are set by higher layers (RRC message). The quantization of the power offset can be found in 3GPP TS 25.213 at Table 1A for instance.

DISCLOSURE OF INVENTION

But in the current 3GPP specification, there is no means to deliver these Power Offsets to Node B. Referring to FIGS. 1(c) and FIG. 2, the prior art Node B of FIG. 1(a) did not have the MAC-hs or complementary HS-DSCH FP layers. If Node B were to know the CQI Power offset, which is an object of the present invention, the Node B receiver could utilize this value for scaling the CQI signal. Scaling the CQI signal is related to the signal level setting, and is used typically in a digital base band implementation, to avoid overflow (i.e. signalling saturation) or underflow (i.e. quantization noise). In ASIC and DSP SW implementations, word length constraints are applied and signals must be scaled accordingly to match with the processing word lengths. If the power offsets for multiple signals are not known by the Node B, as is the case now, signal levels would have to be detected or alternatively in a worst case the Node B receiver would have to be made available for a possible maximum range of each signal. Especially in this case, both fading on the radio path and adaptation POs extend the required range. Signaling to Node B removes the later proportion for the required range. Therefore, if Node B knows the CQI Power Offset then it simplifies receiver implementation (i.e. when measuring DPCCH power level, CQI power level can be calculated and Node B can adjust gains in the different parts of receiver in a simple manner).

If Node B knows the ACK Power Offset and the NACK Power Offset, Node B can utilize these values to detect the ACK/NACK signal. For the ACK and NACK detection, the Node B receiver must also detect the $3^{rd}$ state, DTX (no signal). This requires setting signal detection thresholds. This detection will be more accurate when it is set based on signaled POs than when it is set based on measured offsets.

Since ACK/NACK is a level based detection, if Node B already knows the POs of ACK/NACK, it can detect the signal easily.

If Node B knows the CQI Power Offset it can calculate the CQI power with DPCCH power, Node B doesn't need to measure the offset individually. It can make Node B receiver implementation easier.

If Power Offsets are not given by signalling, Node B is required to measure these Power Offsets individually. This is similar with beta parameters, which are given for DPCCH and for DPDCH, to indicate power offset between those two dedicated physical channels. Of course, in these schemes, the Node B receiver must still detect the DPCCH level, which is the reference for all the Power Offsets, but it doesn't need to detect other signal levels (CQI's, ACKs & NACKs) individually for all multiple signals and this reduces Node B work significantly.

Furthermore it is anticipated that giving Power Offsets to the Node B will make the standard further future-proof when supporting some interference cancelling methods.

Currently, no description can be found from 3 GPP specifications or technical reports about this problem and how to solve it. Therefore, there is no prior art recognition of the problem and consequently no solution either. Without knowing the CQI Power Offset, ACK Power Offset and NACK Power Offset, the Node B receiver has to search the signal for whole possible ranges.

This invention introduces CQI Power Offset, ACK Power Offset and NACK Power Offset on RNSAP and NBAP signalling or HS-DSCH FP.

Since the object is for both the UE and Node B to know the same values, there are two possibilities during the RL setup phase:

(1) SRNC decides the Power Offsets and includes them in the RL SETUP REQUEST message. SRNC also sends the same information to the UE with a proper RRC message.

(2) Node B decides the Power Offsets and includes them in the RL SETUP RESPONSE message. And the SRNC sends the same Power Offsets to the UE with the proper RRC message.

And, there are 3 possibilities to change the POs.

1) SRNC decides to change the Power Offsets and include them in the RL RECONFIGURATION PREPARE message. SRNC also sends the same information to UE with proper RRC message.

2) SRNC decides to change the Power Offsets and include them in the RADIO INTERFACE PARAMETER UPDATE control frame (It should be noted that the name of the control frame can be different than that). SRNC also sends the same information to UE with proper RRC message.

3) Node B decides to change the Power Offsets. In this case there is no existing mechanism for Node B to initiate changing the Power Offsets during the connection and there may be a need to define a new procedure. Alternatively, it could be done in such a way that the SRNC initiates Power Offsets change procedure (e.g. SHO case) by sending an RL RECONFIGURATION PREPARE message with HO indication. Then Node B decides new Power Offsets and sends them back in an RL RECONFIGURATION READY message. SRNC also sends the same information to UE with proper RRC message. The RL RECONFIGURATION PREPARE and RL RECONFIGURATION message formats already exist and can be adapted to the purposes of the invention.

Once Node B has the CQI Power Offset, ACK Power Offset and NACK Power Offset, it will apply CQI Power Offset for CQI slot scaling and ACK Power Offset and NACK Power Offset for ACK and NACK slot detection.

These and other objects, features and advantages of the present invention will become more apparent in light of the following detailed description of a best mode embodiment thereof, as illustrated in the accompanying drawing.

BEST MODE FOR CARRYING OUT THE INVENTION

Abbreviations

CRNC Control RNC (network element)
DPCCH Dedicated Physical Control Channel
DPCH Dedicated Physical Channel
DPDCH Dedicated Physical Data Channel
DSCH Downlink Shared Channel (transport channel)
FDD Frequency Division Duplex (operation mode)
FP Frame Protocol
HARQ Hybrid Automatic Repeat Request (function)
HO Hand Over
HS-DSCH High Speed-Dedicated Shared Channel (transport channel)
HS-PDSCH Physical Downlink Shared Channel
HS-SCCH Shared Control Channel for HS-DSCH
HS-SICH Shared Info Channel for HS-DSCH
HSDPA High Speed Downlink Packet Access (concept)
MAC Medium Access Controller (protocol layer)
MCS Modulation and Coding Scheme
NBAP Node B Application Part
PDSCH Physical Downlink Shared Channel
PO Power Offset
RL Radio Link
RLC Radio Link Control (protocol layer)
RNC Radio Resource Controller (network element)
RNSAP Radio Network Subsystem Application Part
UE User Equipment (user device)

The power of the HS-DPCCH is set as a power offset (PO). These POs can be defined as POs of the DPCH. In detail, they can be defined as PO relative to DPCCH pilot field. In addition, to guarantee full cell-coverage a CQI repetition scheme can be used whereby periodic CQI's are sent in the uplink HS-DPCCH. Node B then sends user data on the HS-DSCH according to its own schedule to the users using time and/or code multiplexing to better utilize the available resources also considering UE capability. The Node B prenotifies the UEs of the transport format and resource combination (TFRC), the multi-code set, as well as the HARQ process control on the HS-SCCH two slots in advance of the HS-DSCH. After receiving the user data on HS-DSCH, the UE sends a CQI and/or ACK/NACK on the uplink HS-DPCCH as a feedback signal after a verification time of several slots. Considering the foregoing, especially the new HSDPA-RRM entities (HRQ, packet scheduling, link adaptation) in the Node B, it will be advantageous for the Node B to know the CQI power offset and the POs of ACK/NACK as givens determined either by itself or by the RNSAP/NBAP of the RNC.

Figure 5:
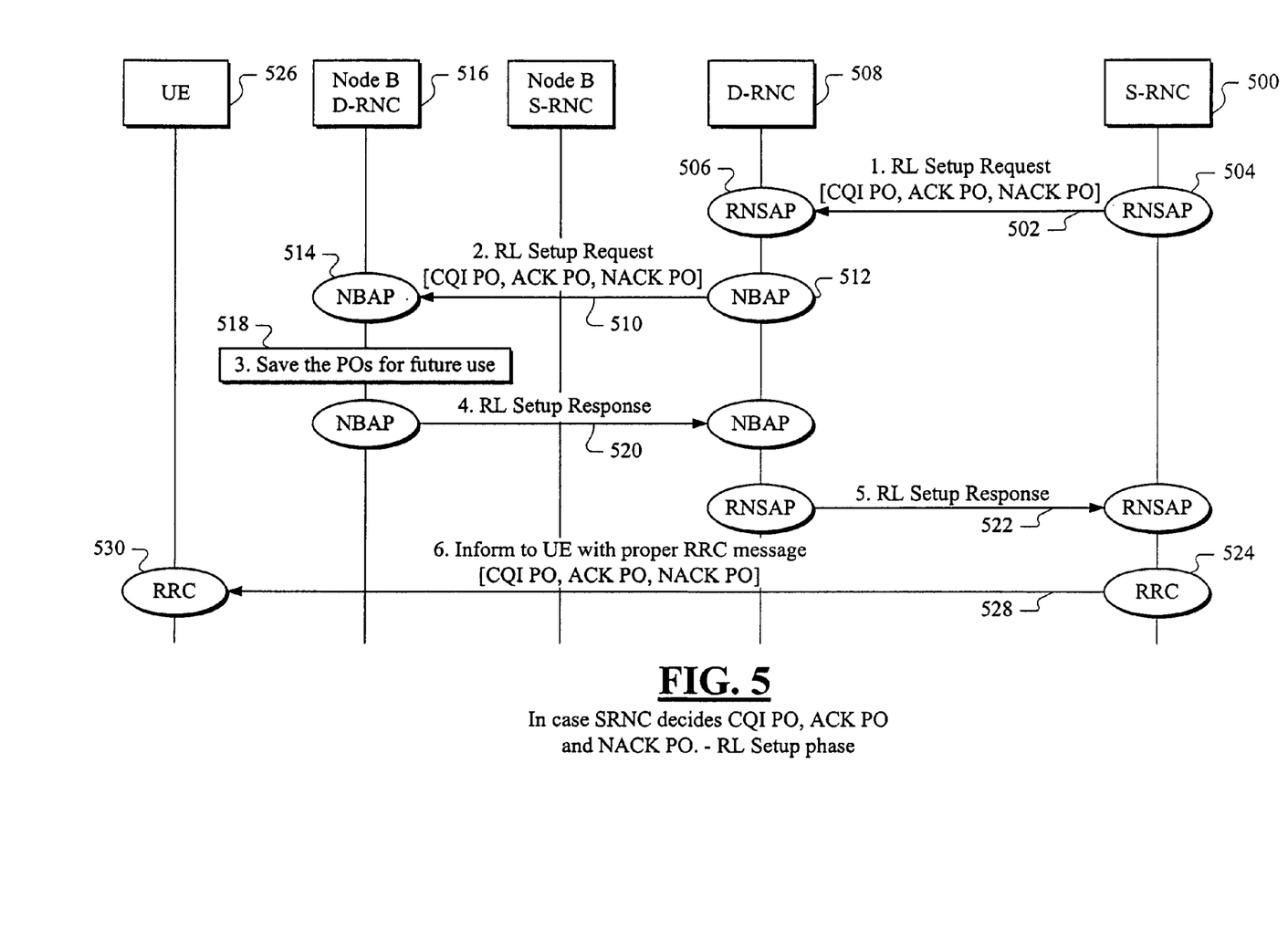
FIG. 5: In case SRNC sets CQI PO, ACK PO and NACK PO-RL Setup Phase.
Figure 6:
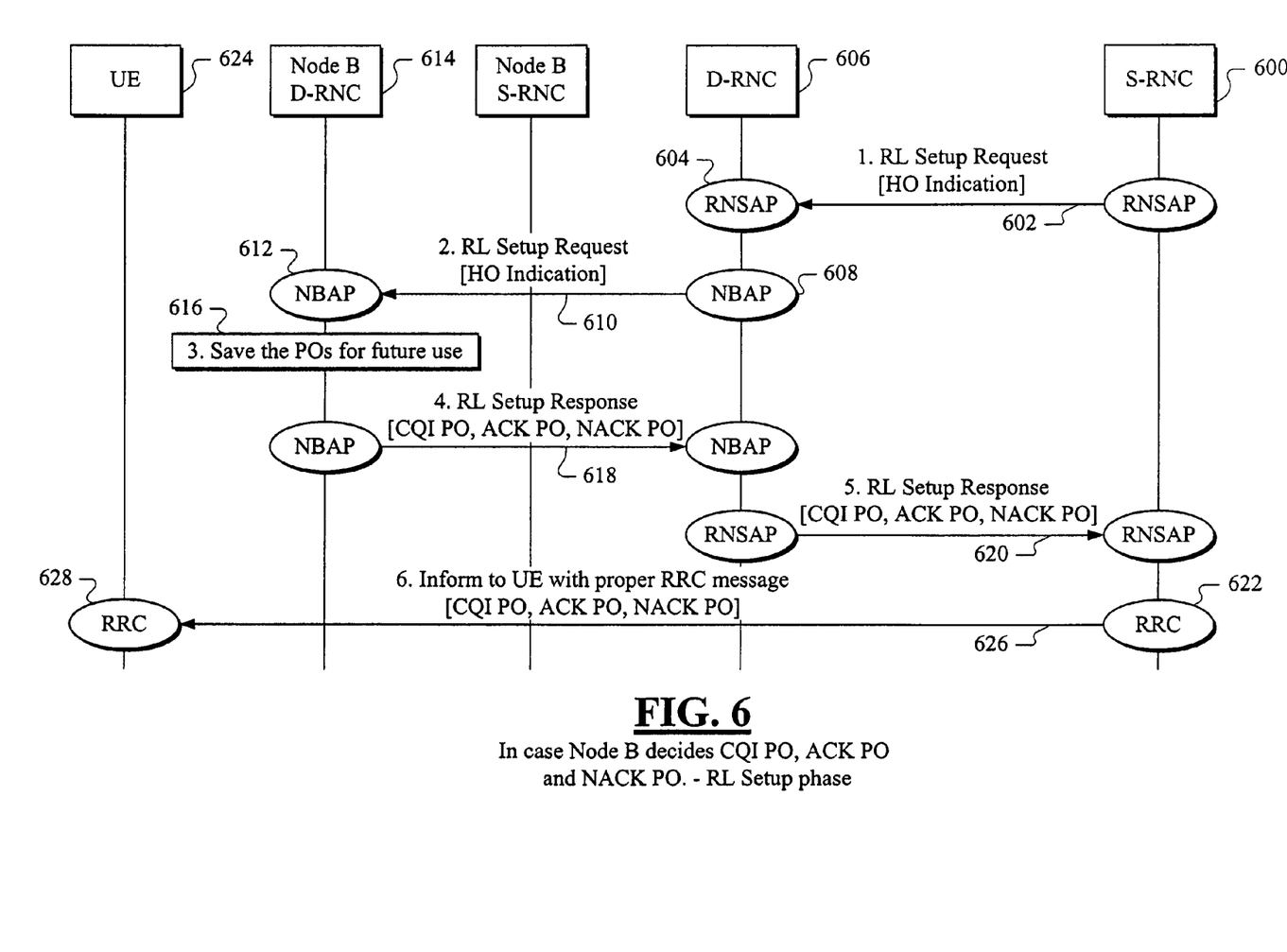
FIG. 6: In case Node B sets CQI PO, ACK PO and NACK PO-RL Setup Phase.

As described in the FIGS. 5 and 6, during the RL Setup phase, there are 2 possibilities for accomplishing this end from the outset:

(1) SRNC decides CQI PO, ACK PO and NACK PO (2) Node B decides CQI PO, ACK PO and NACK PO In the first case, since SRNC knows the SHO status of UE, based on the SHO situation it can decide the CQI PO, ACK PO and NACK PO. In this case SRNC will assign these POs in the RL Setup Request message during RL setup phase. SRNC will send the same values to UE using proper RRC message.

The signalling flow for this example is described in FIG. 5. In FIG. 5, a serving radio network controller (S-RNC) 500 provides an RL SETUP REQUEST message as a signal on a line 502 from a radio network subsystem application part (RNSAP) 504 to an RNSAP 506 of a drift radio network controller (D-RNC) 508. The D-RNC 508 processes the RL SETUP REQUEST signal received on the line 502 and provides said RL SETUP REQUEST signal on a line 510 from a Node B application part (NBAP) 512 of the D-RNC 508 to an NBAP 514 of a Node B 516 under D-RNC 508. The RL SETUP REQUEST signal on the line 502 and on the line 510 may include one or more power offset information elements including a CQI PO, an ACK PO and a NACK PO. In that case, the Node B 516 saves the POs for future use as indicated in a step 518. The step 518 should therefore be viewed as also representative of a memory within said Node B. The NBAP of Node B 516 then sends an RL setup response message as a signal on a line 520 to the NBAP of the D-RNC 508. The D-RNC 508 then sends the RL setup response signal on a line 522 from its RNSAP to the RNSAP of the S-RNC 500. A radio resource control (RRC) 524 of the S-RNC 500 then informs a UE 526 with a proper RRC message signal on a line 528 which is received in the corresponding RRC 530 of the UE 526. The RRC message includes the CQI PO, the ACK PO and the NACK PO for use by the UE in sending CQI's, NACK's and ACK's on the HS-DPCCH uplink to the Node B. Since the Node B has saved the POs for future use, and it therefore already knows these POs, it can use them in interpreting the CQI, ACK and NACK information sent by the UE to the Node B without having to be in the dark, so to speak. As can be seen by the illustration of FIG. 1(b) as compared to that of FIG. 1(a), the process is made more efficient. It should be realized that a given S-RNC 500 may be in direct communication with an associated Node B, and therefore the steps shown in FIG. 5 could be carried out without using the D-RNC 508 as an intermediary. For the sake of completeness, however, FIG. 5 shows the possibility of using a D-RNC intermediate between the S-RNC and the Node B. Consequently, the RL setup request signal on the line 502 can be sent directly to the Node B 516 or via the D-RNC 508. Likewise, the signalling descriptions shown in FIGS. 6, 7A, 7B and 9 should also be understood in this way for signals both in the direction from the S-RNC toward the Node B and in the reverse direction.

In the second case, referring now to FIG. 6, since Node B knows HSDPA related resource status and can be considered to have better knowledge of HSDPA, it can decide the CQI PO, ACK PO and NACK PO. But in this case Node B doesn't know whether it is in an HO situation or not. Therefore the SRNC has to give the HO Indication. As described in FIG. 6, in an RL Setup Request message is sent by an S-RNC 600 by its RNSAP on a line 602 to an RNSAP 604 of a D-RNC 606 and includes an HO Indication. An NBAP 608 of the D-RNC 606 provides an RL SETUP REQUEST message as a signal with the HO indication on a line 610 to an NBAP 612 of a Node B 614 of the D-RNC 606. The Node B 614 then decides the POs based on the HO indication and its own measurements and consequent decisions and saves the POs for future use as indicated in a step 616. After that, the NBAP of the Node B 614 sends an RL setup response message as a signal with the decided PO information elements on a line 618 to the NBAP of the D-RNC 606. The RNSAP of the D-RNC 606 then sends the RL setup response message on a signal line 620 to the RNSAP of the S-RNC 600. An RRC 622 of the S-RNC 600 then informs a UE 624 by means of a proper RRC primitive message on a signal line 626 including the CQI, ACK and NACK PO information elements to an RRC 628 of the UE 624. The UE then uses the PO information in setting the powers of the various CQI, ACK or NACK slots of its HS-DPCCH.

Figure 7A:
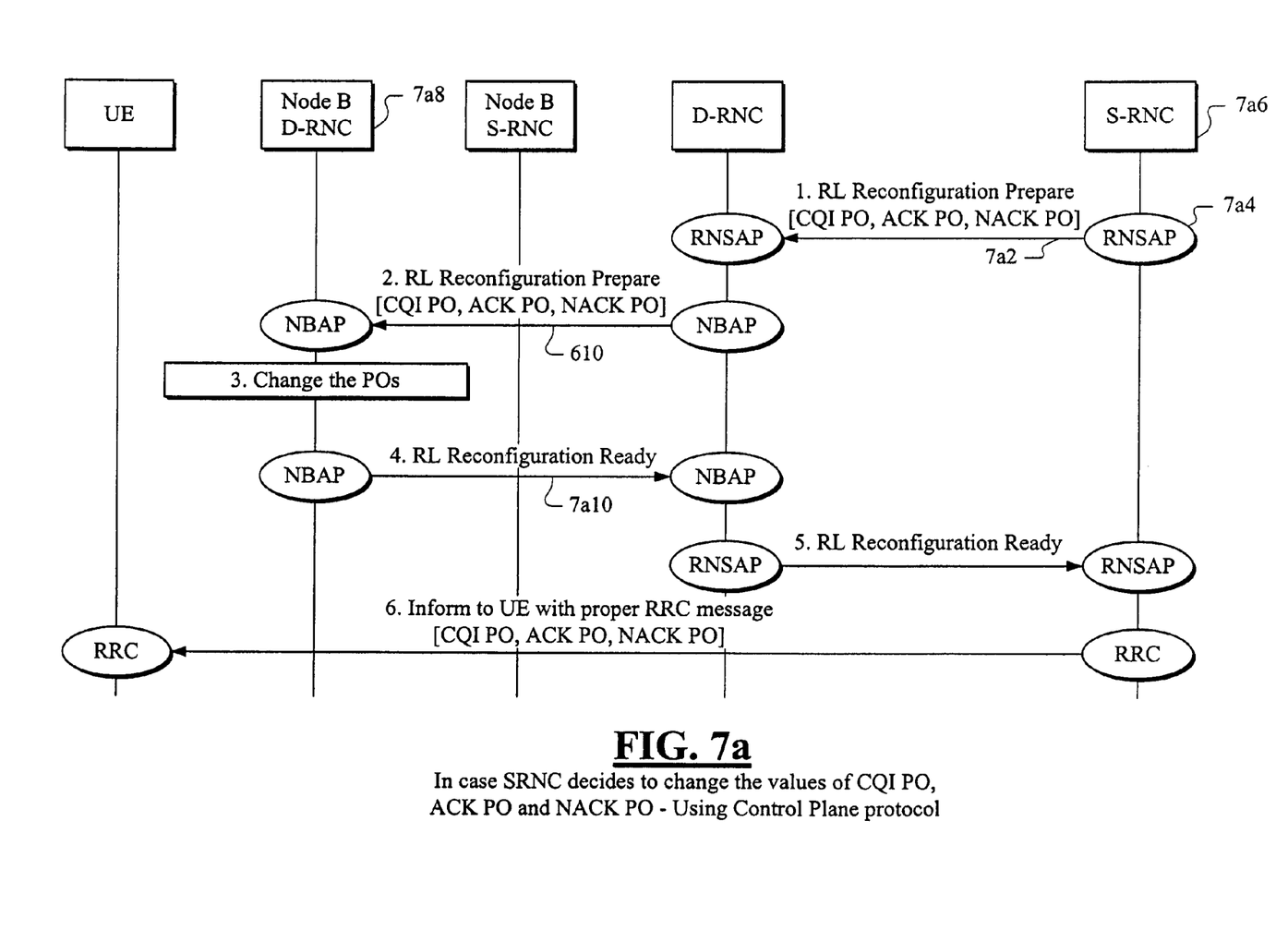
FIG. 7a: In case SRNC decides to change the values of CQI PO, ACK PO and NACK PO—Using Control Plane protocol.
Figure 7B:
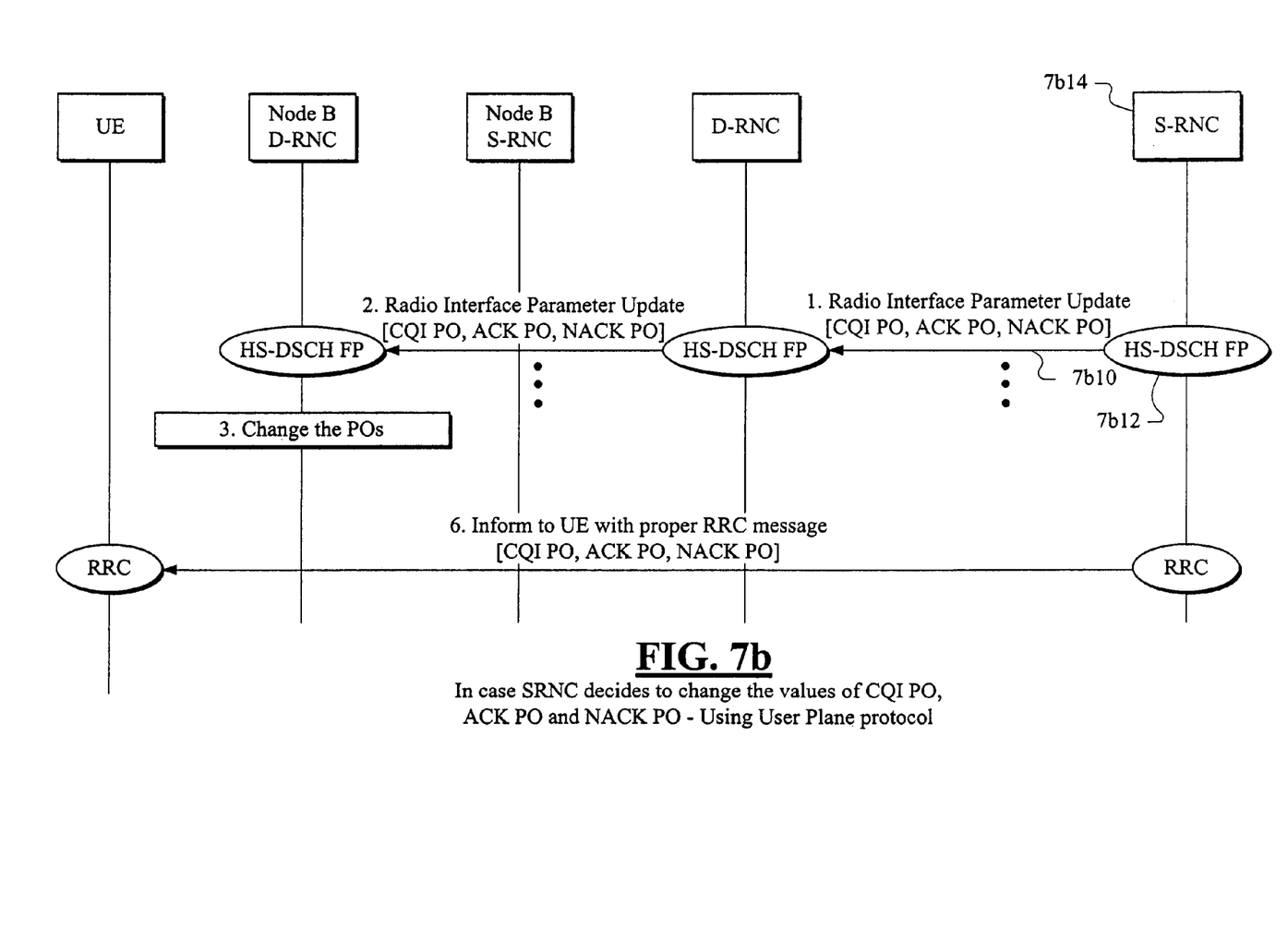
FIG. 7b: In case SRNC decides to change the values of CQI PO, ACK PO and NACK PO—Using User Plane protocol.
Figure 8:
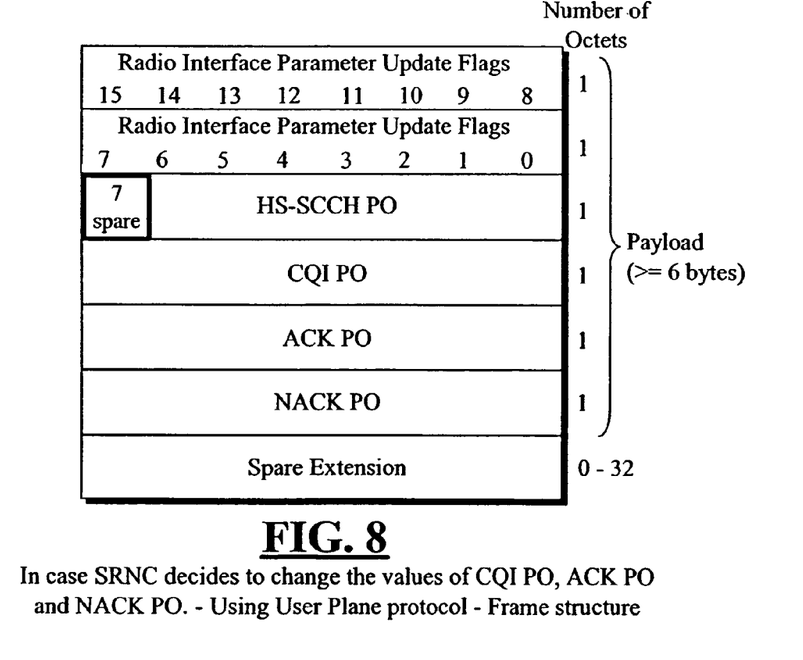
FIG. 8: In case SRNC decides to change the values of CQI PO, ACK PO and NACK PO—Using User Plane protocol—Frame structure.
Figure 9:
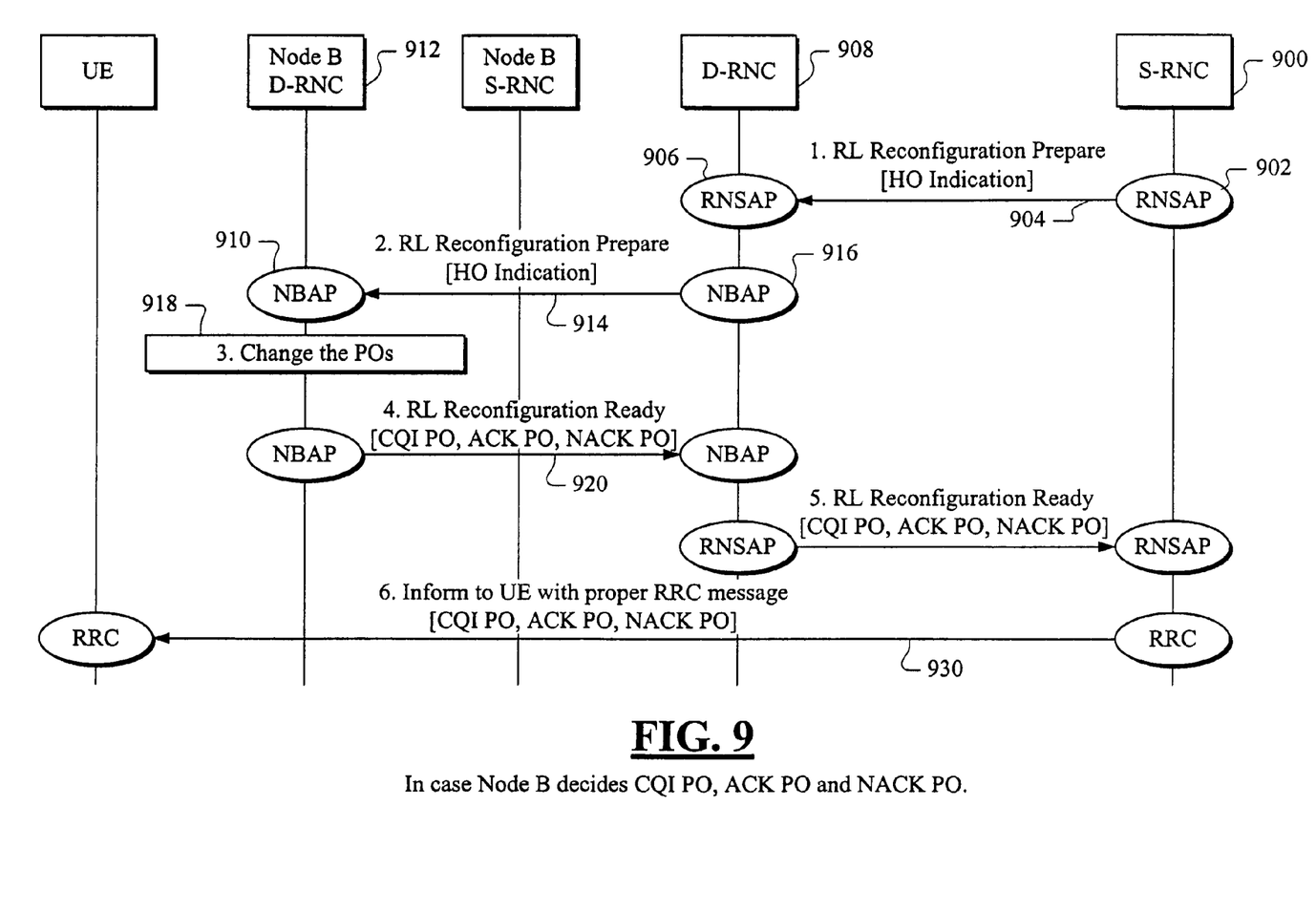
FIG. 9: In case Node B sets CQI PO, ACK PO and NACK PO-RL Setup Phase.

And if SRNC is the node to change the Power Offset values then it can use the Synchronised RL Reconfiguration Procedure as described in FIG. 7a to change the POs, once established. One example of this case can be the soft handover (SHO) situation. In an RL Reconfiguration Preparation message on a signal line 7a2, an RNSAP 7a4 of an SRNC 7a6 can include new CQI PO or/and ACK PO or/and NACK PO or/and and a Node B 7a8 shall apply these new values. And if Node B can use the values it will reply with an RL Reconfiguration Ready primitive message on a line 7a10 as a positive ACK. If Node B cannot use the values, then it will reply with RL Reconfiguration Failure message. In case of SRNC determination of Power Offsets, to change the POs, it is also possible to use a user plane Frame Protocol (FP) as described in FIG. 7b. In this case, in the FP, a proper control frame should be defined or used. For instance like in the DCH FP, it is desirable to define a Radio Interface Parameter Update control frame and deliver these POs in this control frame as shown for instance on a line 7b10 from an HS-DSCH FP 7b12 of an S-RNC 7b14. An example of such a frame structure is depicted in FIG. 8. The name of the control frame or the order of the fields can of course be different than that shown in FIG. 8. The important point here is these Power Offsets can be delivered by a UP control frame. In FIG. 8, the flag points to whether the corresponding Power Offsets are valid data or not. In the example, Flag bit 1 indicates CQI PO, bit2 ACK PO and bit3 NACK PO. If the flag is 1 then the corresponding PO value is valid. Compared to using the control plane, using the user plane is a rather lighter solution. But in the case of using the user plane, the delivery cannot be guaranteed (No response message). Therefore repeatedly sending the same control frame multiple times can be an option. This can make Node B receive the POs with higher probability.

If Node B is the node to change these POs and Node B is the node to initiate a PO change procedure, a new message is needed to be defined from Node B to SRNC so that the new message can include new POs. After receiving new POs, SRNC will forward these new POs to the UE. But if Node B is the node to change these POs and SRNC is the node to initiate the PO change procedure (e.g. SRNC changes the POs during SHO), Synchronised RL Reconfiguration Procedure can be used as describe in FIG. 9. SRNC 900 sends the RL Reconfiguration Prepare message from an RNSAP 902 on a line 904 to an RNSAP 906 of a D-RNC 908 with HO Indicator, and then an NBAP 910 of a Node B 912 receives the HO indication on a line 914 from an NBAP 916 of the D-RNC 908 and decides 918 new POs and sends them back from the NBAP 910 to DRNC in an RL Reconfiguration Ready message 920. After receiving same from the D-RNC RNSAP, the SRNC forward those POs to the UE on a line 930 using a proper RRC message. And this whole procedure can be implemented in FP (Frame Protocol). I.e., SRNC can give the HO indication by control frame in FP and Node B will provide CQI PO, ACK PO and NACK PO in a control frame in FP. And also Node B can provide CQI PO, ACK PO and NACK PO with this control frame without SRNC's request.

When HSDPA is implemented CQI Power Offset, ACK Power Offset and NACK Power Offset signalling will be implemented as defined in the specification. During HSDPA service, always UE and Node B shall have same Power Offset (CQI, ACK and NACK) values. Therefore whenever HSDPA is implemented, this feature should be implemented.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. A method for use by a serving radio network controller of a radio access network, comprising:
    sending a radio link setup request signal to a base station of said radio access network, said radio link setup request signal comprising one or more information elements indicative of one or more corresponding power offsets, said power offsets including at least one of a channel quality indicator power offset, an acknowledge power offset and a negative acknowledge power offset,
    receiving a radio link setup response signal from said base station indicative of receipt of said radio link setup request signal by said base station, and
    sending a radio resource controller message signal to a user equipment device indicative of said one or more power offsets,
wherein said user equipment device uses said one or more power offsets in sending feedback information over a radio interface to said base station at power levels adjusted according to said one or more power offsets.

2. The method of claim 1, wherein sending said radio link setup request signal to said base station comprises sending said radio link setup request signal to a drift radio network controller associated with said base station using radio network layer signaling procedures specified for use between two radio network controllers, and wherein said drift radio network controller sends said radio link setup signal to said base station for storing said one or more power offsets in said base station.

3. The method of claim 1, wherein receiving said radio link setup response signal from said base station comprises receiving said radio link setup response signal from a drift radio network controller associated with said base station, and wherein said drift radio network controller received said radio link response signal from said base station.

4. The method of claim 1, further comprising:
    sending a radio link reconfiguration prepare message signal to said base station directly or via a drift radio network controller associated with said base station with changes to said one or more information elements for said base station to change one or more corresponding power offsets at said base station,
    receiving a radio link reconfiguration ready message signal from said base station directly or via said drift radio network controller, and
    sending a radio resource control message signal to said user equipment device indicative of said one or more information elements sent to said base station.

5. The method of claim 1, further comprising:
    sending a radio interface parameter update signal to said base station directly or via a drift radio network controller associated with said base station, and
    sending a radio resource control message signal to said user equipment device indicative of said update signal sent to said base station.

6. An apparatus, comprising a signal receiving unit, a signal sending unit and a control unit, wherein the apparatus is configured to:
    send a radio link setup request signal to a base station of a radio access network directly or via a drift radio access network controller associated with said base station, said radio link setup request signal comprising one or more information elements indicative of one or more corresponding power offsets, said power offsets including at least one of a channel quality indicator power offset, an acknowledge power offset and a negative acknowledge power offset,
    receive a radio link setup response signal from said base station or via said drift radio network controller indicative of receipt of said radio link setup request signal by said base station, and
    send a radio resource controller message signal to a user equipment device indicative of said one or more power offsets,
wherein said user equipment device uses said one or more power offsets in sending feedback information over a radio interface to said base station at power levels adjusted according to said one or more power offsets.

7. The apparatus of claim 6, wherein said apparatus is further configured to:
    send a radio link reconfiguration prepare message signal to said base station directly or via a drift radio network controller associated with said base station with changes to said one or more information elements for said base station to change one or more corresponding power offsets at said base station,
    receive a radio link reconfiguration ready message signal from said base station directly or via said drift radio network controller, and
    send a radio resource control message signal to said user equipment device indicative of said one or more information elements sent to said base station.

8. The apparatus of claim 6, wherein said apparatus is further configured to:
    send a radio interface parameter update signal to said base station directly or via a drift radio network controller associated with said base station, and
    send a radio resource control message signal to said user equipment device indicative of said update signal sent to said base station.

9. The apparatus of claim 6, wherein the apparatus is a radio network controller of a radio access network.

10. A non-transitory computer readable storage medium storing program codes thereon for use by a serving network controller of a radio access network, said program codes comprise:
    instructions for sending a radio link setup request signal to a base station of said radio access network directly or via a drift radio network controller associated with said base station, said radio link setup request signal comprising one or more information elements indicative of one or more corresponding power offsets, said power offsets including at least one of a channel quality indicator power offset, an acknowledge power offset and a negative acknowledge power offset, instructions for receiving a radio link setup response signal from said base station directly or via said drift radio network controller indicative of receipt of said radio link setup request signal by said base station, and instructions for sending a radio resource controller message signal to a user equipment device indicative of said one or more power offsets, wherein said user equipment device uses said one or more power offsets in sending feedback information over a radio interface to said base station at power levels adjusted according to said one or more power offsets.

11. The non-transitory computer readable medium of claim 10, wherein said program codes further comprise:

instructions for sending a radio link reconfiguration prepare message signal to said base station directly or via a drift radio network controller associated with said base station with changes to said one or more information elements for said base station to change one or more corresponding power offsets at said base station, instructions for receiving a radio link reconfiguration ready message signal from said base station directly or via said drift radio network controller, and instructions for sending a radio resource control message signal to said user equipment device indicative of said one or more information elements sent to said base station.

12. The non-transitory computer readable medium of claim 10, wherein said program codes further comprise:

instructions for sending a radio interface parameter update signal to said base station directly or via a drift radio network controller associated with said base station, and instructions for sending a radio resource control message signal to said user equipment device indicative of said update signal sent to said base station.

* * * * *